(12) United States Patent
Vilendre et al.

(10) Patent No.: US 10,082,235 B1
(45) Date of Patent: Sep. 25, 2018

(54) FLOOR TRAP PRIMER VALVE

(71) Applicant: JL Industries, Inc., Portland, OR (US)

(72) Inventors: Jack S Vilendre, West Linn, OR (US); M Kevin Hardwick, North Plains, OR (US)

(73) Assignee: JL Industries, Inc., Portland, OR (US)

( * ) Notice: Subject to any disclaimer, the term of this patent is extended or adjusted under 35 U.S.C. 154(b) by 0 days.

(21) Appl. No.: 15/610,429

(22) Filed: May 31, 2017

(51) Int. Cl.
*F16L 55/07* (2006.01)
*F16L 55/24* (2006.01)
*E03F 7/00* (2006.01)
*E03C 1/296* (2006.01)
*F16L 55/00* (2006.01)
*E03C 1/00* (2006.01)

(52) U.S. Cl.
CPC .............. *F16L 55/24* (2013.01); *E03C 1/296* (2013.01); *E03F 7/00* (2013.01); *E03C 1/00* (2013.01); *F16L 55/00* (2013.01)

(58) Field of Classification Search
CPC .............. F16L 55/24; E03C 1/296; E03F 7/00
USPC .... 137/247.15, 247.25, 102, 115.03, 115.07, 137/118.05, 135, 148, 253, 473, 487, 41, 137/101.27, 131, 145, 150.5
See application file for complete search history.

(56) References Cited

U.S. PATENT DOCUMENTS

| | | | | |
|---|---|---|---|---|
| 288,573 A | * | 11/1883 | Hyde ...................... | C02F 1/763 137/114 |
| 680,380 A | * | 8/1901 | Hyde ...................... | C02F 1/763 134/114 |
| 2,154,659 A | * | 4/1939 | Boydston ................ | E03C 1/296 137/118.05 |
| 3,134,392 A | * | 5/1964 | Goss ....................... | E03C 1/296 137/118.05 |
| 3,333,597 A | * | 8/1967 | Sullivan .................. | E03C 1/296 137/102 |
| 3,422,835 A | * | 1/1969 | Watts ....................... | E03C 1/296 137/115.06 |
| 3,776,269 A | * | 12/1973 | Watts ....................... | E03D 11/00 137/118.05 |
| 4,204,556 A | * | 5/1980 | Sullivan .................. | E03C 1/296 137/204 |
| 4,497,337 A | | 2/1985 | Mosbrucker et al. | |
| 4,882,789 A | * | 11/1989 | Kraverath ............... | E03C 1/122 4/661 |
| 5,209,254 A | * | 5/1993 | Ancselovics ............ | E03C 1/00 137/357 |
| 5,263,508 A | | 11/1993 | Perrott | |
| 5,287,877 A | * | 2/1994 | Ackroyd ................. | E03C 1/296 137/118.05 |

(Continued)

*Primary Examiner* — Minh Le
(74) *Attorney, Agent, or Firm* — Kolisch Hartwell, P.C.

(57) ABSTRACT

An improved trap primer valve may include a valve body having a central tube having a proximal end coupled to an outlet orifice and an open distal end extending into a longitudinal bore of the valve, such that fluid exiting the outlet orifice passes through the central tube. A plug, including a head portion and a rod extending from the head portion into the central tube, may be configured to selectively seat against the distal end of the central tube. An annular cartridge surrounding the central tube may have one or more apertures leading to a partially water-filled inner chamber, and may be configured to unseat the plug in automatic response to a fluctuation in system water pressure, thereby opening the valve and charging a downstream trap.

20 Claims, 7 Drawing Sheets

(56) References Cited

U.S. PATENT DOCUMENTS

| | | | | |
|---|---|---|---|---|
| 5,678,588 | A * | 10/1997 | Perrott | E03C 1/296 137/1 |
| 5,797,419 | A * | 8/1998 | Perrott | E03C 1/102 137/118.05 |
| 6,152,164 | A | 11/2000 | Whiteside | |
| 6,325,091 | B1 * | 12/2001 | Perrott | E03C 1/296 137/247.25 |
| 6,422,260 | B2 * | 7/2002 | Danowski | E03C 1/296 137/118.05 |
| 7,191,606 | B1 * | 3/2007 | Dwyer | F24F 13/222 62/150 |
| 7,520,292 | B2 * | 4/2009 | Weltman | E03C 1/296 137/118.05 |
| 8,671,970 | B2 | 3/2014 | Vilendre et al. | |
| 9,708,808 | B2 * | 7/2017 | Stanaland | E03F 5/041 |
| 2007/0277880 | A1 * | 12/2007 | Vilendre | E03C 1/296 137/247.25 |
| 2008/0302988 | A1 * | 12/2008 | Vilendre | E03C 1/12 251/129.09 |

\* cited by examiner

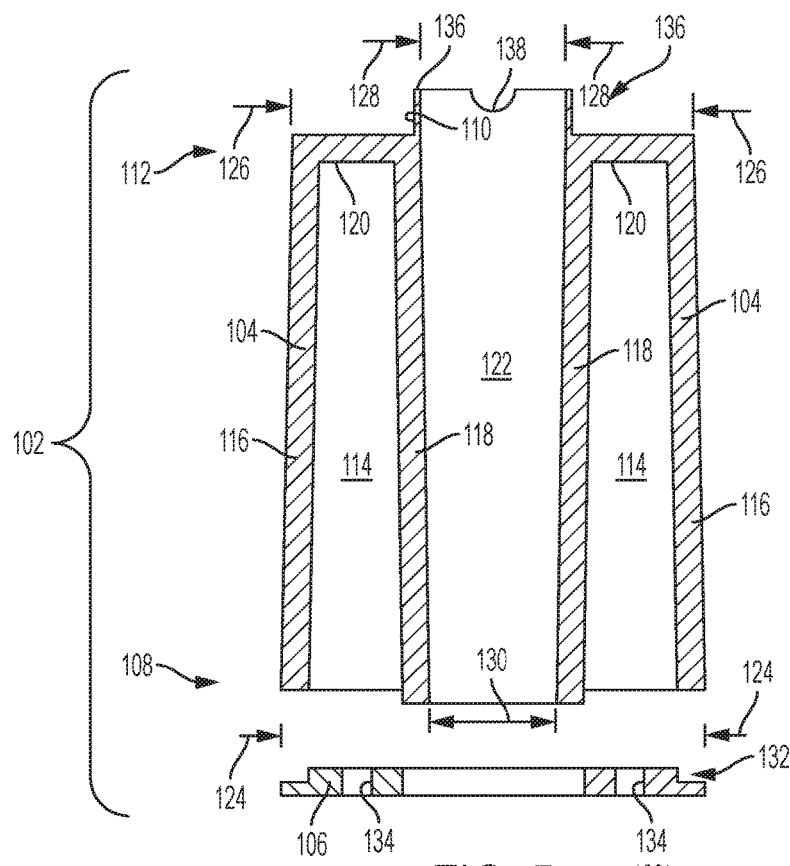
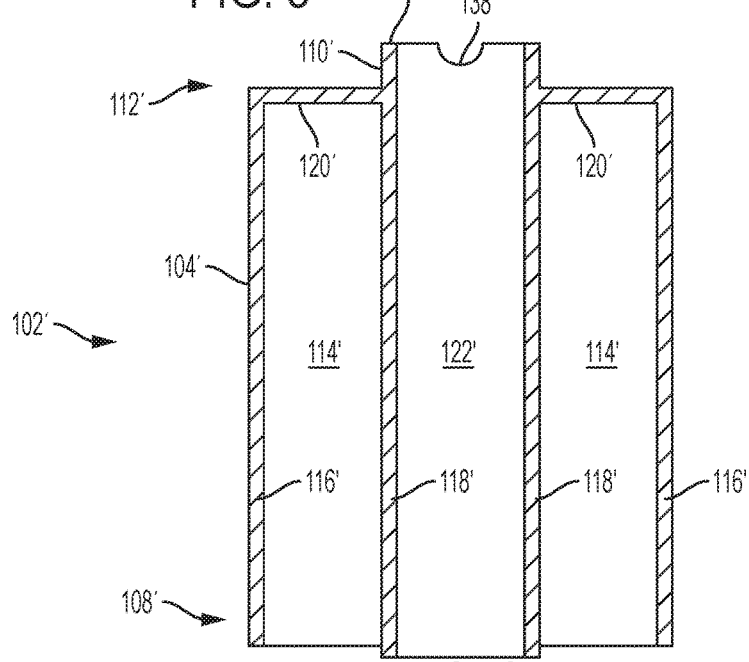

US 10,082,235 B1

FLOOR TRAP PRIMER VALVE

INTRODUCTION

Floor trap primer valves are commonly used to ensure sewer line water traps have sufficient water to prevent the escape of sewer gases from downstream sewer pipes, through floor drains and into human occupied spaces. Because the water in such traps can dissipate over time, due to evaporation, pressure events, and the like, devices such as primer valves are needed to replenish the trap water. In many cases, such devices are mandated by local codes.

Trap primer valves are typically connected on their inlet side to a building water supply line, with an outlet coupled to the floor trap. A temporary dip in building water pressure will automatically actuate the trap primer valve, thereby providing a small amount of water to the trap. Traps do not typically over-fill, because excess water merely escapes through the downstream sewer pipe.

SUMMARY

The present disclosure provides systems, apparatuses, and methods relating to trap primer valves having improved actuation, reliability, and manufacturability.

In some embodiments, a trap primer valve may include: a valve body having a longitudinal bore in fluid communication with an inlet orifice and an outlet orifice; a central tube having a proximal end coupled to the outlet orifice and an open distal end extending into the longitudinal bore, such that fluid exiting the outlet orifice passes through the central tube; a piston including a head portion and a rod extending from the head portion into the central tube, such that the rod is in sliding engagement with the central tube and the head portion of the piston is configured to selectively seat against the distal end of the central tube; and an annular cartridge including a body portion in sliding engagement with the longitudinal bore and surrounding the central tube, the annular cartridge further including a base having one or more apertures leading to an inner chamber; wherein the annular cartridge is shorter than the central tube.

In some embodiments, a trap primer valve assembly may include: a valve body having a longitudinal bore in fluid communication with an upper inlet orifice and a lower outlet orifice, a hollow central tube having a proximal end coupled to the outlet orifice and an open distal end extending upward into the longitudinal bore, such that water exiting the outlet orifice passes through the central tube; a water source coupled to the inlet orifice of the valve body, the water source having a variable water pressure; a plug movably disposed within the longitudinal bore and configured to be selectively seated against the distal end of the central tube, the water pressure biasing the plug toward a seated position; and an annular cartridge independent of the plug and movably disposed between the central tube and an inner wall of the longitudinal bore, the annular cartridge having a single inner chamber partially filled with water, such that the cartridge is configured to rise when the water pressure is reduced, unseating the plug from the distal end of the central tube, and sink when the water pressure is increased, allowing the plug to reseat against the distal end of the central tube.

In some embodiments, a method for priming a sewer trap may include: selectively releasing an amount of water to a sewer trap using a trap primer valve coupled to a water supply line having a variable water pressure, the trap primer valve comprising a longitudinal bore in fluid communication with an upper inlet orifice and a lower outlet orifice, a central tube having a proximal end coupled to the outlet orifice and an open distal end extending upward into the longitudinal bore, such that water exiting the outlet orifice passes through the central tube; wherein selectively releasing the amount of water includes: in response to a temporary reduction of water pressure in the water supply line, permitting a flow of water from the water supply line through the trap primer valve by unseating a plug from the distal end of the central tube using a separate annular cartridge disposed between the central tube and an inner wall of the longitudinal bore, the annular cartridge having only a single inner chamber partially filled with water, such that the annular cartridge automatically rises within the trap primer valve and unseats the plug when the water pressure is reduced; and in response to a subsequent increase of the water pressure in the water supply line, preventing the flow of water from the water supply line through the trap primer valve by automatically sinking the annular cartridge and allowing the plug to be seated on the distal end of the central tube.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 5 is an exploded sectional side view of an illustrative cartridge suitable for use in trap primer valves in accordance with aspects of the present disclosure.

FIG. 6 is a sectional side view of another illustrative cartridge suitable for use in trap primer valves in accordance with aspects of the present disclosure.

DESCRIPTION

Various aspects and examples of a floor trap primer valve having a raised central seat with a corresponding plug actuated by a separate, annular cartridge, as well as related methods, are described below and illustrated in the associated drawings. Unless otherwise specified, a trap primer valve according to the present teachings and/or its various components may, but are not required to, contain at least one of the structure, components, functionality, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Definitions

The following definitions apply herein, unless otherwise indicated.

"Substantially" means to be essentially conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

Figure 1:
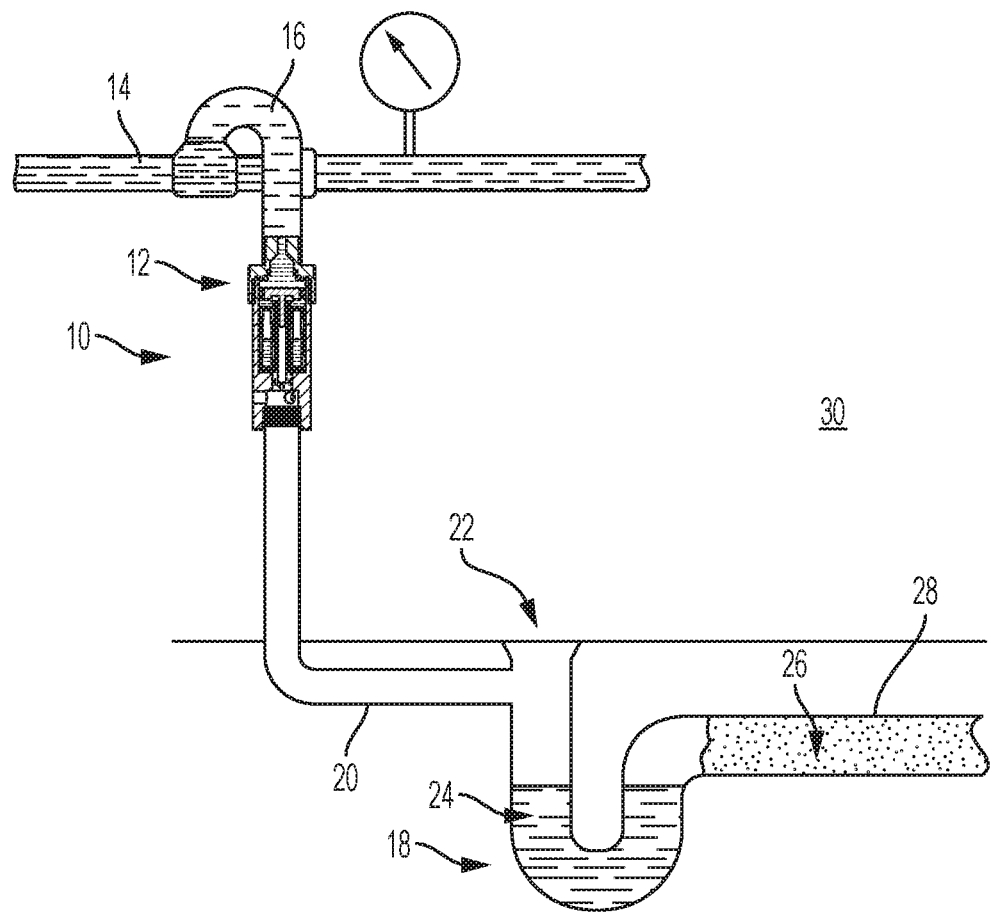
FIG. 1 is a schematic elevation view of an illustrative plumbing system including a trap primer valve in accordance with aspects of the present disclosure.

The terms "upper," "lower," "top," "bottom," "vertical," (and the like) are intended to be understood in the context of a host system in which valves described herein may be installed or otherwise incorporated. For example, a trap primer valve is typically installed in a vertical manner with the inlet of the valve above the outlet, as shown in FIG. 1, which provides the context for such directional terms. In the absence of a host system, the same directional terms may be used as if the valve were installed in such a system. For example, even when viewed in isolation, a trap primer valve may have a top end and a bottom end, based on the fact that the ends in question correspond to the inlet and outlet, respectively.

Overview

In general, a trap primer valve according to the present teachings includes a valve body having a longitudinal bore in fluid communication with an upper inlet orifice and a lower outlet orifice. A hollow central tube has a proximal end coupled to the outlet orifice and an open distal end extending upward into the longitudinal bore. Water exiting the outlet orifice of the valve passes through the central tube. Accordingly, the distal end of the central tube functions as a raised valve seat for opening and closing the valve.

A variable-pressure water source (e.g., a household or building potable water line) is coupled to the inlet orifice of the valve. A plug is movably disposed within the longitudinal bore and configured to be selectively seated against the distal end of the central tube. The water pressure from the water source biases the plug toward a seated position. The water source has a positive pressure, which is higher than the atmospheric pressure present at the unpressurized outlet of the valve. Accordingly, a differential pressure is normally present across the valve, which causes the plug to preferentially be urged toward and seated against the distal end of the central tube.

The valve includes an annular cartridge that is independent of the plug and movably disposed between the central tube and an inner wall of the longitudinal bore. The annular cartridge has a single inner chamber partially filled with water, leaving a pressurized air pocket in an upper portion of the chamber. Accordingly, the cartridge is configured to rise when the water pressure is reduced. This causes the cartridge to unseat the plug from the distal end of the central tube. Similarly, the cartridge is configured to sink when the water pressure is increased or returned to normal pressure, allowing the plug to reseat against the distal end of the central tube. Aspects of the operation of this cartridge correspond to those of a so-called "Cartesian diver" device.

With reference to FIG. 1, an illustrative plumbing system 10 (also referred to as a trap primer valve assembly) is depicted, including a trap primer valve 12 as described above. Trap primer valve 12 may be suitable for use in other plumbing systems and arrangements, and system 10 is shown as a non-limiting illustration. In this example, an inlet of valve 12 is coupled to a variable-pressure water source 14, also referred to as a water supply or water supply line, by an inlet line 16. Valve 12 is also coupled, at an outlet end, to a floor/sewer trap 18 by a gravity line 20. Trap 18 is a standard sewer trap, forming a U-shaped pipe below a floor drain 22. Trap 18 normally contains a volume of water 24. The U-shaped pipe is configured to retain water 24, such that water 24 prevents the passage of a sewer gas 26 from the downstream sewer pipe 28. This is desirable, for example, to prevent the sewer gas from passing into a living space 30 through floor drain 22. Water 24 is therefore critical to the operation of trap 18. However, this water may be lost over time, e.g., through evaporation and other mechanisms. Trap primer valve 12 ensures the presence of water 24 in trap 18 by releasing an amount of water from water source 14 whenever pressure in the water supply line drops temporarily (e.g., when a toilet is flushed or a faucet is opened). In other words, valve 12 charges or "primes" the trap, and is accordingly called a trap primer valve.

Examples, Components, and Alternatives

The following sections describe selected aspects of exemplary trap primer valves, as well as related systems and/or methods. The examples in these sections are intended for illustration and should not be interpreted as limiting the entire scope of the present disclosure. Each section may include one or more distinct embodiments or examples, and/or contextual or related information, function, and/or structure.

Illustrative Trap Primer Valve

Figure 2:
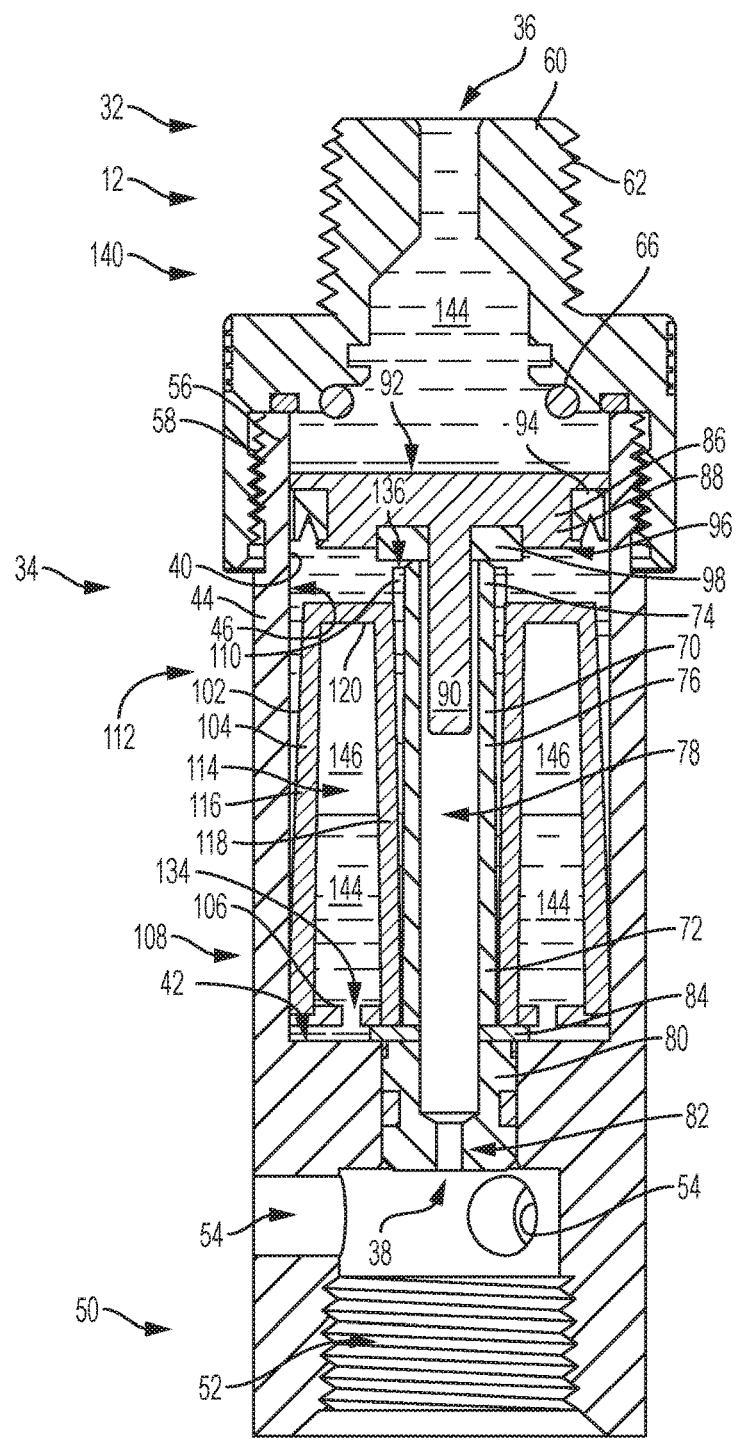
FIG. 2 is a sectional side view of an illustrative trap primer valve according to the present teachings, in a first (shut) configuration.
Figure 3:
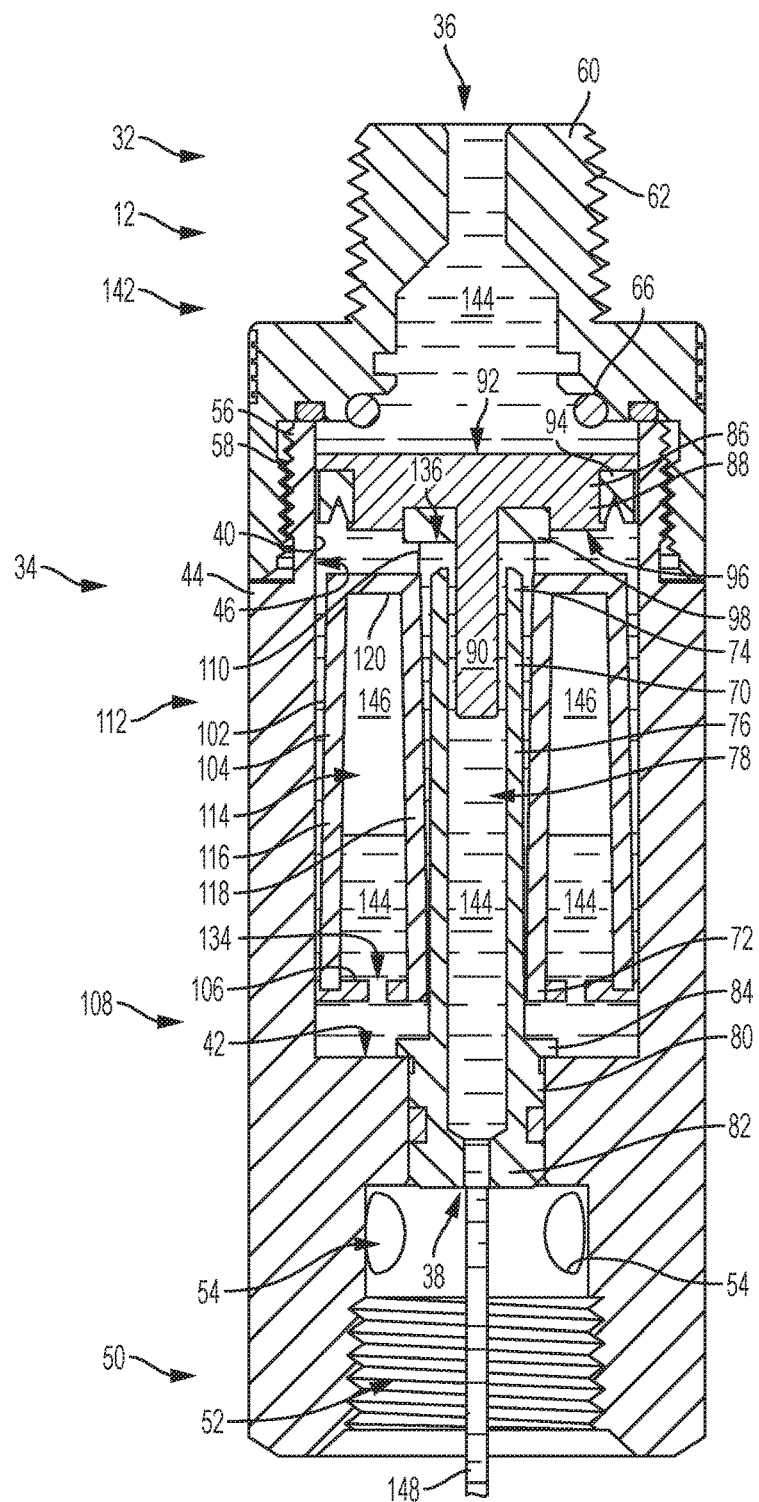
FIG. 3 is a sectional side view of the valve of FIG. 2, in a second (open) configuration.
Figure 4:
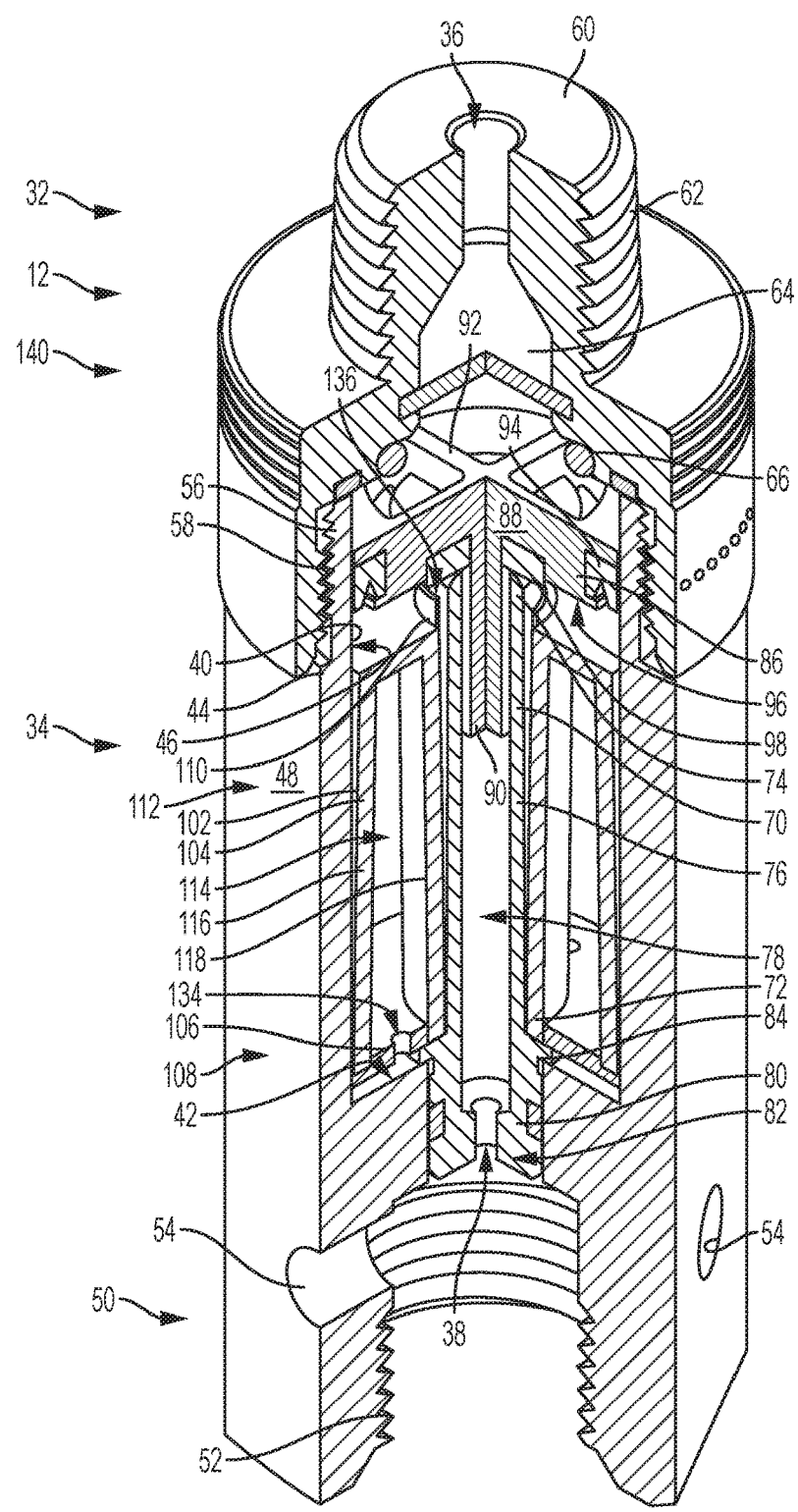
FIG. 4 is an isometric partially cut away view of an illustrative trap primer valve in accordance with aspects of the present disclosure.

As shown in FIGS. 2-8, this section describes an illustrative trap primer valve 32. Valve 32 is an example of trap primer valve 12, described in the Overview above. Accordingly, the substantive description of the illustrative trap primer valve in the Overview section applies to valve 32 as well. FIG. 2 is a sectional side view of trap primer valve 32 in a first (shut or closed) configuration 140. FIG. 3 is a sectional side view of trap primer valve 32 in a second (open) configuration 142. FIG. 4 is an isometric partial cutaway view of trap primer valve 32 in a dry condition and in the shut configuration. FIG. 5 is an exploded sectional view of an illustrative annular cartridge of valve 32. FIG. 6 is a partial sectional view of another illustrative annular cartridge suitable for use in valve 32.

With reference to FIGS. 2-4, trap primer valve 32 includes a valve body 34 having an inlet orifice 36 at the top and an outlet orifice 38 at the bottom, valve body 34 having a longitudinal bore 40 in fluid communication with the inlet and outlet orifices. Longitudinal bore 40 extends upward from a floor 42 (at the bottom of the bore), and forms a cylindrical passage configured to house and guide other components of valve 32. Bore 40 may be referred to as a guide. In some examples, bore 40 may have a cross-sectional shape other than circular, such as a hexagon or other polygonal shape. Valve body 34 includes a wall 44 having an inner surface 46 and outer flats 48 (see FIG. 4), e.g., for grasping with a wrench during installation or removal. Because of the cylindrical inner surface 46 and at least partially polygonal outer surface formed by flats 48, wall 44 has a varying thickness. This may be seen by comparing FIG. 2 to FIG. 1, where the valve body has been rotated such that the sectional cut is taken through different thicknesses of wall 44.

Valve body 34 may comprise any suitable material, such as brass. A lower end portion 50 of valve body 34 includes a threaded connector portion 52 (e.g., a female connector) for connection to an outlet line (e.g., gravity line 20). One or more vacuum-breaking vent openings 54 are present in lower end portion 50, to prevent any inadvertent suction upward through the gravity line. The gravity line is not intended to be filled with water, but rather to act as a conduit for individual slugs of water exiting valve 32. These slugs are further configured to exit in a high-speed, narrow stream (see FIG. 2), such that the exiting water does not pass through vent openings 54.

An upper end portion 56 of valve body 34 includes a threaded connector portion 58 (e.g., a male connector) for fastening to a corresponding threaded portion of a cap 60. Cap 60 forms a removable upper enclosure of valve 32, and facilitates assembly and disassembly of the valve. Cap 60 includes inlet orifice 36, which passes through a threaded connector portion 62. Connector portion 62 is configured to be connected to an inlet line (e.g., line 16). Connector portion 62 is depicted as having a threaded interface. However, any suitable plumbing connection method may be used. The cap may also house an inlet screen 64 (see FIG. 4) for filtering out debris, etc., and an O-ring 66. O-ring 66 forms a sealing surface against which an upper surface of the valve plug (described below) can seat if inlet pressure is lost or if a vacuum is formed at the inlet (e.g., if the household water supply line is drained), thereby preventing any backflow through valve 32.

A rigid, freestanding central tube 70 extends upward from floor 42 into bore 40. Central tube 70 includes a proximal end 72 (at the bottom), which is coupled to outlet orifice 38, and terminates at an open distal end 74 (at the top). A cylindrical wall 76 of tube 70 forms an inner passage 78. Inner passage 78 continues through an insert portion 80 in floor 42, and is reduced to form a nozzle 82 before reaching outlet orifice 38. A step 84 extends around the base of central tube 70 where the tube meets floor 42. The opening in distal end 74 of central tube 70 forms the only exit available to water passing through the longitudinal bore 40. Accordingly, water passing from the inlet orifice to the outlet orifice must pass through central tube 70 via open distal end 74.

Figure 7:
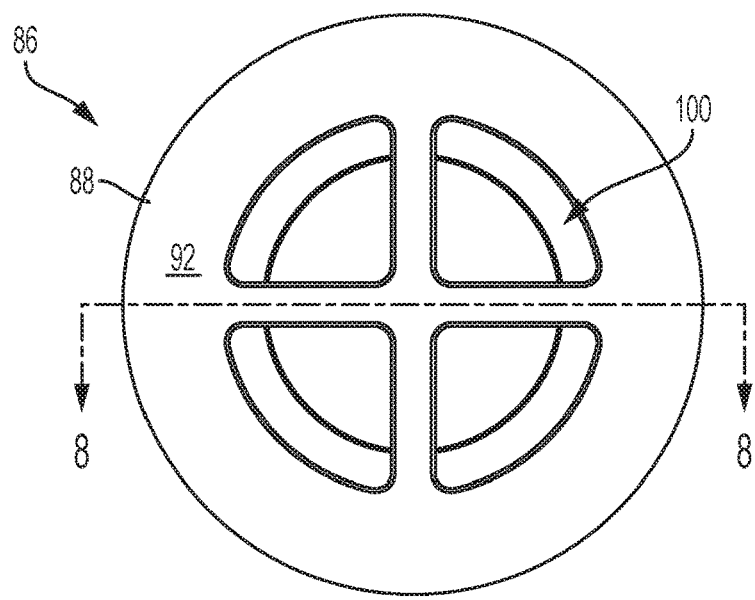
FIG. 7 is an overhead plan view of an illustrative piston-type plug suitable for use in trap primer valves in accordance with aspects of the present disclosure.
Figure 8:
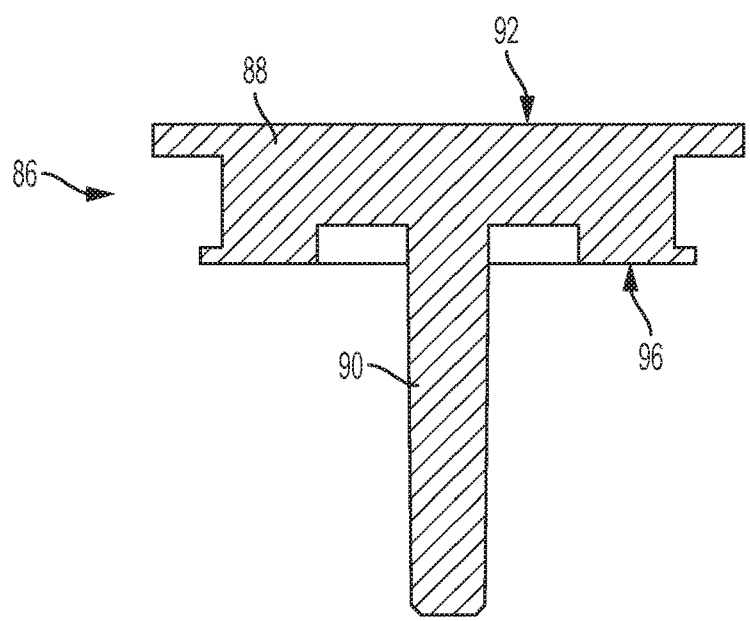
FIG. 8 is a sectional side view of the plug of FIG. 7, taken at line 8-8.

A vertically movable plug 86 is slidingly engaged in longitudinal bore 40 at an upper end of the central tube. Plug 86 is configured to selectively seat against distal end 74 of central tube 70, thereby blocking or allowing flow through the valve. Distal end 74 may also be referred to as the seat or valve seat of valve 32. Plug 86 may include any suitable structure configured to sealingly abut distal end 74 of the central tube, and to be displaceable within bore 40. In some embodiments, such as the one shown in FIGS. 2-4, plug 86 comprises a piston having a head portion 88 and a rod or shaft 90 extending downward from the head portion into inner passage 78 of the central tube. FIGS. 7 and 8 depict an overhead plan view and a sectional elevation view of an isolated plug 86. Shaft 90 is in sliding engagement with central tube 70, facilitating the controlled upward and downward movement of head portion 88 within longitudinal bore 40. For example, shaft 90 ensures that head portion 88 remains in the same horizontal orientation as it moves up and down. Shaft 90 has a diameter that is smaller than the inner diameter of the central tube, such that water can flow through the central tube around shaft 90 as needed. The head and shaft portions of plug 86 may be unitary, and may comprise any suitable material (e.g., plastic, metal, or a composite). In some examples, head portion 88 and shaft 90 may be formed as a single piece, e.g., by injection molding.

Head portion 88 includes an upper face 92, a circumferential wear ring 94, and a lower face 96. A resilient seal 98 is held in the lower face around shaft 90, and is configured to seal against an upper edge of distal end 74 of the central tube. The outer diameter of head portion 88 is slightly less than the inner diameter of longitudinal bore 40, permitting the flow of water around the head portion. Wear ring 94 and seal 98 are removed in FIG. 8 to show the corresponding recesses in which they are disposed. As depicted in FIG. 7, upper face 92 of head portion 88 may include one or more recesses or cavities 100, e.g., for weight reduction. In some examples, cavities 100 may pass through the head portion to permit fluid communication through the plug.

An annular cartridge 102 surrounds central tube 70 below plug 86, and is configured to move up and down within bore 40. Annular cartridge 102 includes a body portion 104 having a base 106 at a bottom end 108, and a collar 110 extending upward adjacent central tube 70 from a top end 112. A sectional side view of annular cartridge 102 is shown in FIG. 5, and a partial sectional side view of an alternate embodiment 102' of annular cartridge 102 is depicted in FIG. 6. In some examples, such as the one depicted in FIGS. 2-4, cartridge 102 is shorter than central tube 70, as measured from floor 42, such that the cartridge does not interfere with the seating of plug 86 when resting in a sunken position.

Body portion 104 includes an inner annular chamber 114. In this example, body portion 104 includes only one such chamber, which is annular and continuous within an outer wall 116, an inner wall 118, a ceiling 120, and a floor formed by base 106. In some examples, additional inner chambers may be present, and/or inner chamber 114 may be compartmentalized or divided. In this example, chamber 114 is an undivided annular chamber, and is the only chamber within body portion 104. This simplifies manufacturability and improves reliability.

Body portion 104 is generally cylindrical. In some examples, such as the one shown in FIGS. 2-4, the overall shape of body portion 104 may be frustoconical, with a slight tapering from bottom 108 to top 112. In the frustoconical examples, a central opening 122 (see FIG. 5) of cartridge 102 may be tapered in the opposite direction as the outer body, i.e., narrowing slightly from top to bottom. Accordingly, in some examples of annular cartridge 102, such as the one depicted in FIG. 5, body portion 104 tapers from a larger outer diameter 124 at bottom 108 to a smaller outer diameter 126 at top 112. In some examples, central opening 122 tapers from a larger inner diameter 128 at top 112 to a smaller inner diameter 130 at bottom 108 (see FIG. 5).

In other examples, such as the one depicted in FIG. 6, a body portion 104' of a cartridge 102' has an outer wall 116', an inner wall 118', a ceiling 120', and a central opening 122', all of which form a substantially straight cylinder, without tapering from top to bottom or from bottom to top.

Base 106, which forms the floor of inner chamber 114, is a substantially flat, annular ring insertable into a lower end of body portion 104. Base 106 includes a stepped outer circumference 132 (see FIG. 5) to ensure proper positioning and provide continuity with body portion 104 when installed. Base 106 may be held in place by a friction fit and/or may be affixed, e.g., using an adhesive. In some examples, base 106 is unitary with body portion 104. In some examples, base 106 is formed as a separate component to simplify manufacturability. Base 106 further includes one or more apertures or holes 134 leading to inner chamber 114, and providing fluid communication between longitudinal bore 40 and the inner chamber.

Collar 110 includes any suitable protrusion extending from or adjacent to the upper end of central opening 122. Collar 110 protrudes from body portion 104 around central tube 70. For example, as shown in FIGS. 2-6, collar 110 may be a substantially cylindrical protrusion having an upper lip 136. One or more notches 138 are formed in upper lip 136 (see FIGS. 5-6). Notches 138 facilitate water flow past the collar when lip 136 abuts resilient seal 98 on lower face 96 of plug 86. Notches 138 may include any suitable cutout or shape, e.g., a semicircular notch 138 as shown in FIG. 5 and a semicircular notch 138' in a lip 136' of a collar 110' in FIG. 6. Other openings may be utilized, such as apertures/holes formed through collar 110. In some examples, collar 110 may include a mesh or grid structure, such that the collar can displace plug 86 while still allowing the flow of water past (i.e., through) the collar.

Illustrative Operation

Based on the various structures and functions described above, the operation of valve 32 will now be described. FIG. 2 shows valve 32 in the first (shut) configuration 140, and FIG. 3 shows valve 32 in the second (open) configuration 142. Valve 32 is automatically and repeatably transitionable between the first configuration and the second configuration.

When the water supply line coupled to inlet orifice 36 is operating at a standard or normal pressure (i.e., a steady-state pressure), water 144 fills the upper portion of valve 32, including longitudinal bore 40. Water 144 passes around plug 86 and around cartridge 102, through spaces between the bore and the outer wall of cartridge 102, as well as between the central tube and the inner wall of cartridge 102. Water 144 passes under cartridge 102, and up through holes 134, partially filling inner chamber 114. Water can flow under the cartridge, in part because base 106 rests on step 84, leaving a gap between the bottom of the annular cartridge and floor 42 of the bore. As shown in FIGS. 2 and 3, a pocket or bubble of air 146 is trapped in an upper portion of inner chamber 114 and compressed by the water pressure.

During steady-state operation, the water pressure from the water source is sufficient that cartridge 102 has a negative or neutral buoyancy. Accordingly, cartridge 102 remains in a lowered position, and does not interfere with plug 86. The differential pressure across the valve biases plug 86 against distal end 74 of central tube 70. The valve is therefore shut, with resilient seal 98 abutting distal end 74 and preventing water flow through tube 70 to outlet orifice 38. In some examples, cartridge 102 has a slightly positive buoyancy, but the buoyancy is nevertheless insufficient to overcome the biasing of the plug.

With reference to FIG. 3, when water pressure drops in the supply line (e.g., due to a temporary event, such as a toilet flush or opening of a faucet), water pressure in valve 32 also drops, and cartridge 102 rises due to the resulting increase in its buoyancy. This causes collar 110 to impinge on plug 86, and to urge head portion 88 of plug 86 upward, thereby opening the valve by dislodging the plug from distal end 74 of central tube 70. Water 144 can then flow through notch(es) 138 in collar 110 and downward through hollow inner passage 78 of central tube 70. As described above, the outer diameter of shaft 90 is smaller than the inner passage of tube 70. Accordingly, the flow of water is not blocked by the presence of shaft 90.

Water 144 then passes through nozzle 82 and exits valve 32 as a stream 148 through outlet orifice 38 (see bottom of FIG. 3). The narrowing of nozzle 82 (i.e., from the larger diameter of inner passage 78 to the smaller diameter of outlet orifice 38) causes a natural decrease in pressure and increase in exit velocity, and ensures that stream 148 passes through the outlet of the valve without going through the vacuum-breaking vent apertures.

When water pressure returns to steady state levels, pressure within valve 32 increases, and the buoyancy of cartridge 102 is returned to its original level. Cartridge 102 therefore sinks or drops around central tube 70. The cartridge no longer interferes with plug 86, and plug 86 is again seated against distal end 74 of the central tube. This shuts the valve and prevents further flow of water 144.

Illustrative Method for Priming a Sewer Trap

Figure 9:
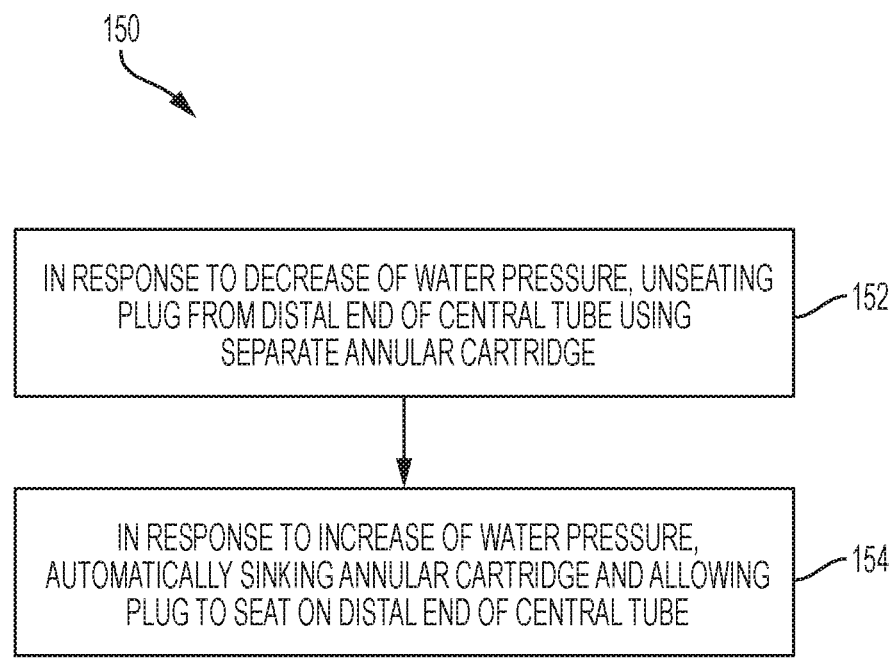
FIG. 9 is a flowchart depicting steps in an illustrative method for priming a sewer trap in accordance with aspects of the present disclosure.

This section describes steps of an illustrative method for priming a sewer trap; see FIG. 9. Aspects of trap primer valves described above may be utilized in the method steps described below. Where appropriate, reference may be made to components and systems that may be used in carrying out each step. These references are for illustration, and are not intended to limit the possible ways of carrying out any particular step of the method.

FIG. 9 is a flowchart illustrating steps performed in an illustrative method, and may not recite the complete process or all steps of the method. FIG. 9 depicts multiple steps of a method, generally indicated at 150, which may be performed in conjunction with trap primer valves according to aspects of the present disclosure. Although various steps of method 150 are described below and depicted in FIG. 9, the steps need not necessarily all be performed, and in some cases may be performed in a different order than the order shown. In some examples, one or more steps may be repeated.

Method 150 includes selectively releasing an amount of water to a sewer trap using a trap primer valve (e.g., valves 12, 32) coupled to a water supply line (e.g., water source 14) having a variable water pressure. The trap primer valve has a longitudinal bore in fluid communication with an upper inlet orifice and a lower outlet orifice, and a central tube having a proximal end coupled to the outlet orifice and an open distal end extending upward into the longitudinal bore. Water exiting the outlet orifice passes through the central tube. Valve 32 is an example of a trap primer valve suitable for use in method 150.

Step 152 of method 150 includes permitting a flow of water from the water supply line through the trap primer valve, in response to a temporary reduction of water pressure in the water supply line. Such a temporary reduction of water pressure may occur from normal use of the system, such as flushing toilets, opening and closing faucets, etc. Flow is achieved by unseating a plug from the distal end of the central tube using a separate annular cartridge disposed between the central tube and an inner wall of the longitudinal bore.

The annular cartridge may have a single inner chamber (e.g., only one chamber) partially filled with water, such that the annular cartridge automatically rises within the trap primer valve and unseats the plug when the water pressure is reduced. In other words, the buoyancy of the annular cartridge may correspond to or be proportional to the water pressure, e.g., due to air trapped within the chamber. In some examples, the single inner chamber is continuous and annular. In some examples, unseating the plug includes contacting the plug using a collar extending from an upper portion of the annular cartridge. In some examples, permitting the flow of water from the water supply line through the trap primer valve includes permitting water to flow through a notch formed in an upper lip of the collar. In some examples, the annular cartridge has a bottom and a top, and the annular cartridge tapers from a larger outer diameter at the bottom to a smaller outer diameter at the top.

Step 154 of method 150 includes, in response to a subsequent increase of the water pressure in the water supply line, preventing the flow of water from the water supply line through the trap primer valve by automatically sinking the annular cartridge and allowing the plug to be seated on the distal end of the central tube. As described above, due to the trapped air in the inner chamber, the buoyancy of the cartridge corresponds to the pressure of the water, such that an increase in pressure causes the cartridge to sink. The annular cartridge may be configured to have a neutral or negative buoyancy at normal (steady-state) operating pressures for the water supply.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A trap primer valve comprising:
   a valve body having a longitudinal bore in fluid communication with an inlet orifice and an outlet orifice;
   a central tube having a proximal end coupled to the outlet orifice and an open distal end extending into the longitudinal bore, such that fluid exiting the outlet orifice passes through the central tube;
   a piston including a head portion and a rod extending from the head portion into the central tube, such that the rod is in sliding engagement with the central tube and the head portion of the piston is configured to selectively seat against the distal end of the central tube; and
   an annular cartridge including a body portion in sliding engagement with the longitudinal bore and surrounding the central tube, the annular cartridge further including a base having one or more apertures leading to an inner chamber;
   wherein the annular cartridge is shorter than the central tube.

2. The trap primer valve of claim 1, wherein the inner chamber is a single chamber.

3. The trap primer valve of claim 2, wherein the inner chamber is continuous and annular.

4. The trap primer valve of claim 1, the inlet orifice of the valve body being coupled to a source of variable pressure water, wherein the annular cartridge is partially filled with water, leaving an air pocket in an upper portion of the inner chamber, such that changes in water pressure cause the annular cartridge to move up and down within the longitudinal bore.

5. The trap primer valve of claim 4, wherein the annular cartridge is configured to selectively unseat the head portion of the piston from the distal end of the central tube.

6. The trap primer valve of claim 1, wherein the annular cartridge further comprises an upper collar extending from the body portion of the cartridge.

7. The trap primer valve of claim 6, wherein the upper collar is a substantially cylindrical protrusion having a notch formed in an upper lip.

8. The trap primer valve of claim 1, wherein the annular cartridge is substantially cylindrical.

9. The trap primer valve of claim 1, wherein the annular cartridge has a bottom and a top, and the annular cartridge tapers from a larger outer diameter at the bottom to a smaller outer diameter at the top.

10. The trap primer valve of claim 9, wherein the cartridge has a central opening, and the central opening tapers from a larger inner diameter at the top to a smaller inner diameter at the bottom.

11. A trap primer valve assembly comprising:
   a valve body having a longitudinal bore in fluid communication with an upper inlet orifice and a lower outlet orifice, a hollow central tube having a proximal end coupled to the outlet orifice and an open distal end extending upward into the longitudinal bore, such that water exiting the outlet orifice passes through the central tube;
   a water source coupled to the inlet orifice of the valve body, the water source having a variable water pressure;
   a plug movably disposed within the longitudinal bore and configured to be selectively seated against the distal end of the central tube, the water pressure biasing the plug toward a seated position; and
   an annular cartridge independent of the plug and movably disposed between the central tube and an inner wall of the longitudinal bore, the annular cartridge having a single inner chamber partially filled with water, such that the cartridge is configured to rise when the water pressure is reduced, unseating the plug from the distal end of the central tube, and sink when the water pressure is increased, allowing the plug to reseat against the distal end of the central tube.

12. The trap primer valve assembly of claim 11, further comprising a sewer trap coupled to the outlet orifice of the valve body.

13. The trap primer valve assembly of claim 11, wherein the annular cartridge further comprises a collar extending upward from the cartridge.

14. The trap primer valve assembly of claim 13, wherein the collar is a substantially cylindrical protrusion having a notch formed in an upper lip.

15. The trap primer valve assembly of claim 11, wherein the annular cartridge has a bottom and a top, and the annular cartridge tapers from a larger outer diameter at the bottom to a smaller outer diameter at the top.

16. A method for priming a sewer trap, the method comprising:
    selectively releasing an amount of water to a sewer trap using a trap primer valve coupled to a water supply line having a variable water pressure, the trap primer valve comprising a longitudinal bore in fluid communication with an upper inlet orifice and a lower outlet orifice, a central tube having a proximal end coupled to the outlet orifice and an open distal end extending upward into the longitudinal bore, such that water exiting the outlet orifice passes through the central tube;
    wherein selectively releasing the amount of water includes:
        in response to a temporary reduction of water pressure in the water supply line, permitting a flow of water from the water supply line through the trap primer valve by unseating a plug from the distal end of the central tube using a separate annular cartridge disposed between the central tube and an inner wall of the longitudinal bore, the annular cartridge having only a single inner chamber partially filled with water, such that the annular cartridge automatically rises within the trap primer valve and unseats the plug when the water pressure is reduced; and
        in response to a subsequent increase of the water pressure in the water supply line, preventing the flow of water from the water supply line through the trap primer valve by automatically sinking the annular cartridge and allowing the plug to be seated on the distal end of the central tube.

17. The method of claim 16, wherein the single inner chamber is continuous and annular.

18. The method of claim 16, wherein unseating the plug from the distal end of the central tube using the separate annular cartridge includes contacting the plug using a collar extending from an upper portion of the annular cartridge.

19. The method of claim 18, wherein permitting the flow of water from the water supply line through the trap primer valve includes permitting water to flow through a notch formed in an upper lip of the collar.

20. The method of claim 16, wherein the annular cartridge has a bottom and a top, and the annular cartridge tapers from a larger outer diameter at the bottom to a smaller outer diameter at the top.

* * * * *